US012768642B2

(12) United States Patent
Iseli et al.

(10) Patent No.: US 12,768,642 B2
(45) Date of Patent: Oct. 20, 2026

(54) COORDINATE MEASURING SYSTEM

(71) Applicant: HEXAGON INNOVATION HUB GMBH, Heerbrugg (CH)

(72) Inventors: Claudio Iseli, Au (CH); Frank Valpertz, Drolshagen (DE)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 740 days.

(21) Appl. No.: 18/077,969

(22) Filed: Dec. 8, 2022

(65) Prior Publication Data

US 2023/0194240 A1 Jun. 22, 2023

(30) Foreign Application Priority Data

Dec. 21, 2021 (EP) .................................... 21216600

(51) Int. Cl.
*G01B 11/00* (2006.01)
*G01B 5/012* (2006.01)

(52) U.S. Cl.
CPC ............ *G01B 11/007* (2013.01); *G01B 5/012* (2013.01)

(58) Field of Classification Search
CPC .... G01B 5/012; G01B 11/007; G01B 5/0014; G01B 21/045
See application file for complete search history.

(56) References Cited

U.S. PATENT DOCUMENTS 9,739,606 B2 8/2017 Jonas et al.
10,054,422 B2 8/2018 Bockem et al.
(Continued)

FOREIGN PATENT DOCUMENTS

CN 108 296 877 A 7/2018
CN 108351203 A 7/2018
EP 0 546 784 A2 6/1993
(Continued)

OTHER PUBLICATIONS

R.H. Schmitt, et al., "Advances in Large-Scale Metrology—Review and future trends," CIRP Annals, vol. 65, Issue 2, pp. 643-665 (Jun. 2016).

(Continued)

*Primary Examiner* — Jennifer Bahls
(74) *Attorney, Agent, or Firm* — Maschoff Brennan

(57) ABSTRACT

A coordinate measuring system for determining 3D coordinates of an object, comprising a coordinate measuring device comprising an arrangement of sensors configured to generate measurement data from which 3D coordinates of measurement points on the object are derivable, and a computing device configured to determine, based on the measurement data, 3D coordinates of the measurement points, and for storing nominal data of the object in a data storage, the nominal data comprising nominal dimension data of the object for a pre-defined temperature, wherein the nominal data comprises one or more expansion coefficients of the object, the coordinate measuring system comprises at least one temperature sensor that is configured to determine actual temperature values of the object, the at least one temperature sensor is configured to generate temperature data; and the computing device is configured to determine tempered coordinates of the object.

20 Claims, 10 Drawing Sheets

(56) References Cited

U.S. PATENT DOCUMENTS

| | | | | |
|---|---|---|---|---|
| 2014/0222372 | A1* | 8/2014 | Sprenger .............. | G05B 19/404<br>702/155 |
| 2021/0191359 | A1 | 6/2021 | Iseli et al. | |

FOREIGN PATENT DOCUMENTS

| | | | | |
|---|---|---|---|---|
| EP | 2 270 425 | A1 | 1/2011 | |
| EP | 2 980 526 | A1 | 2/2016 | |
| EP | 2 742 316 | B1 | 5/2017 | |
| WO | WO-2013021157 | A1 * | 2/2013 | ............. G01B 5/008 |

OTHER PUBLICATIONS

Extended European Search Report dated Jun. 3, 2022 as received in Application No. 21216600.3.

* cited by examiner

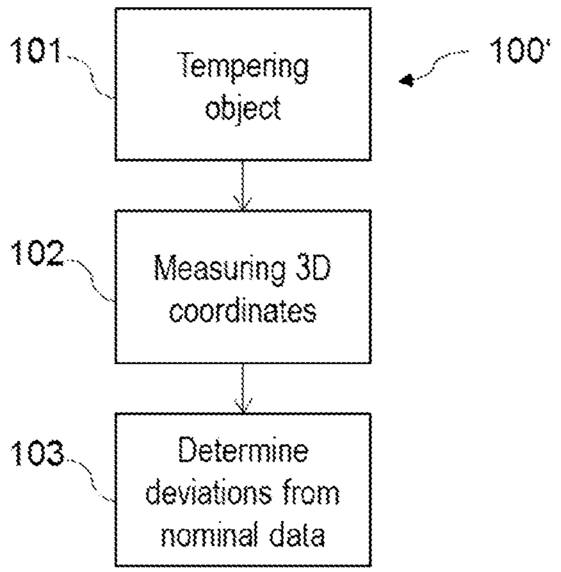
Fig. 8 *(prior art)*
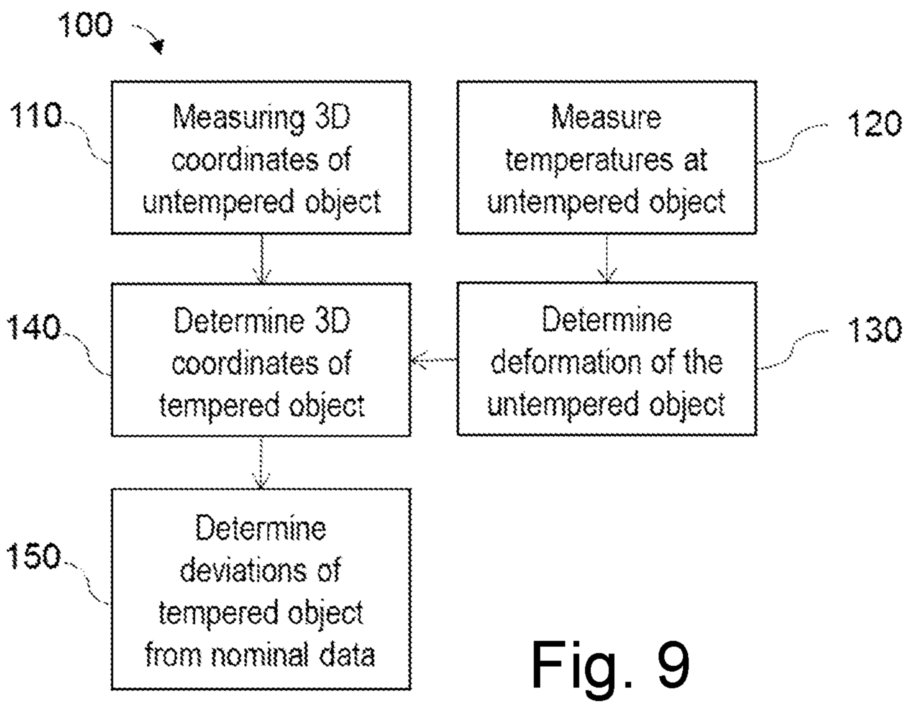
Fig. 9

COORDINATE MEASURING SYSTEM

BACKGROUND

The present invention generally pertains to a coordinate measuring system for determining spatial coordinates of measurement points on an object. The system comprises a coordinate measuring device, e.g. embodied as a coordinate measuring machine (CMM), one or more temperature sensors for determining temperatures of the object measured by the coordinate measuring device, and a thermal compensation functionality that allows compensating temperature-induced distortions of the measured object and/or predicting dimensions of the same object at a pre-defined temperature.

It is common practice to inspect a workpiece after its production to determine the accuracy of the production process, that is, workpiece dimensions, correctness of angles, etc. For instance, such a measurement can be performed using a CMM. For inspection, the workpiece is put on a base of such a CMM and a probe head being movable relative to the base is guided to predetermined measurement points of the workpiece to obtain the exact coordinate data of these points. Thus, it is possible to determine the production accuracy of the workpiece.

In a conventional CMM—e.g. as disclosed in EP 2 270 425 A1—the probe head is supported for movement along three mutually perpendicular axes (in directions X, Y and Z). Thereby, the probe head can be guided to any arbitrary point within a working volume of the coordinate measuring machine. In order to determine the coordinates, known measurement means capable to determine the probe head's distance from a known point of origin are employed. For instance, scales or other suitable measuring means are used for this purpose. The obtained coordinate data can then be stored in a memory such as a RAM and used for further processing.

Coordinate measuring devices for inspecting workpieces during or after production comprise laser trackers, for instance as disclosed in EP 2 980 526 A1. Laser trackers are measuring devices that are typically used in industrial surveying and are designed for progressive tracking of a target point and a coordinate position determination of this point. A target point can be represented in this case by a retroreflective unit (e.g. a cube prism), which is targeted using an optical measurement beam of the measuring device, in particular a laser beam. The laser beam is reflected in parallel back to the laser tracker, wherein the reflected beam is captured using a capture unit of the device. An emission or reception direction of the beam is ascertained in this case, for example, by means of sensors for angle measurement, which are associated with a deflection mirror or a targeting unit of the system. In addition, a distance from the measuring device to the target point is ascertained with the capture of the beam, for example, by means of runtime or phase difference measurement or by means of the Fizeau principle. Laser trackers additionally may comprise an optical image capture unit having a two-dimensional, light-sensitive array, for example, a CCD or CID camera or a camera based on a CMOS array, or having a pixel array sensor and having an image processing unit. The laser tracker and the camera can be installed one on top of another in this case, in particular in such a manner that the positions thereof in relation to one another are not variable. The camera is, for example, rotatable together with the laser tracker about its essentially perpendicular axis, but is pivotable up-and-down independently of the laser tracker and is therefore arranged separately from the optics system of the laser beam in particular. Furthermore, the camera—for example, in dependence on the respective application—can be embodied as pivotable about only one axis. In alternative embodiments, the camera can be installed in an integrated construction together with the laser optic in a shared housing. With the capture and analysis of an image—by means of image capture and image processing unit—of a so-called measuring aid instrument having markings, the relative locations of which to one another are known, an orientation of an object (for example, a probe), which is arranged on the measuring aid instrument, in space can be concluded. Together with the determined spatial position of the target point, furthermore the position and orientation of the object in space can be precisely determined absolutely and/or in relation to the laser tracker.

Workpieces that need to be measured precisely can have an inhomogeneous temperature distribution that also can differ significantly from that of the measuring machine and its surroundings. Also, the temperature distribution changes over time and is also dependent on the type of fixation. For instance, basically identical workpieces that are to be measured in a CMM or by a laser tracker after being produced can have different temperature distributions, due to different storage or transport conditions or distinct process influences. Moreover, these temperature distributions usually differ from the nominal conditions of the workpiece design. In most cases, the design envisages a homogeneous temperature distribution with a "normal temperature" of, e.g., 20° C.

Deviations from this homogeneous normal temperature influence dimensional measurements on the workpiece due to temperature-influence including local or overall deformations (e.g. expansions). Conventionally, in order to eliminate this influence, workpieces may be tempered to the pre-defined normal temperature. Local workpiece expansions due to the influence of temperature are thus eliminated during measurements in a CMM or by a laser tracker. However, this conventional approach has the disadvantage of a long waiting time until the temperatures in the workpiece are equalized to the normal temperature. This adjustment time depends, amongst other things, on the initial temperatures in the workpiece and on the heat inertia of the workpiece—or of different heat inertias due to different materials used for different parts of the workpiece. Since tempering a workpiece may thus take a long time before a measurement can be made, it would be desirable to reduce the waiting time and thus the overall time between production and inspection of a workpiece sample.

If the temperature expansion state of a workpiece would be known, tempering the workpiece would not be necessary. Then, during the measurement, for each measuring point on the workpiece, the temperature expansion can be taken into account and compensated in the measurement result, i.e. providing the temperature-dependent expansion relative to normal temperature.

Some CMMs follow a different approach, wherein the workpiece is clamped on the machine and a temperature sensor is attached to the workpiece at a defined point or measurements are performed at individual points with a temperature sensor controlled by the CMM. Using these sensor values, an average value is formed for a specific point in time. Based on this, and assuming a homogeneous temperature in the workpiece, the measurements may be calculated back to a normal temperature.

The main disadvantage of this method arises from the "homogeneous view" of the workpiece which—especially if the workpiece consists of more than one material—rarely corresponds to reality. Also, effects from local heat outflow (or inflow) are ignored. Consequently, this form of compensation can only be used for low precision applications.

It would be desirable to have a solution which avoids these disadvantages and can be used for highly precise measurements.

An example for a thermal imaging temperature sensor for use in a CMM to determine a temperature of a workpiece is disclosed in EP 546 784 A2.

CN 108 296 877 A generally discloses the application of thermal expansion coefficients for machine tools. Temperatures of workpieces are monitored during machining, and actual thermal expansion coefficients are calculated by combining theoretical values and actual detected workpiece sizes. However, this approach is not configured for measuring applications and does not include internal or residual stresses in the workpiece due to fixation of the workpiece.

U.S. Pat. No. 9,739,606 B2 discloses a CMM for inspecting a multitude of workpieces thereby correcting temperature variations by measuring temperatures of a master piece. This approach has the disadvantages that in order to work, the process needs to be exactly the same for each workpiece and all workpieces need to have exactly the same properties regarding temperature distribution.

SUMMARY

It is therefore an object of the present disclosure to provide a coordinate measuring system and a method that reduce the time for preparing a workpiece for measuring.

It is another object to provide such a system and method that allow determining workpiece coordinates with high precision.

It is another object to provide such a system and method that allow taking thermal expansion coefficients of the workpieces into consideration.

At least one of these objects is achieved by the coordinate measuring system described herein.

A first aspect of the disclosure pertains to a coordinate measuring system for determining 3D coordinates of an object. The system comprises a coordinate measuring device comprising an arrangement of sensors configured to generate measurement data from which 3D coordinates of at least one measurement point on the object are derivable. For instance, said arrangement of sensors may comprise distance sensors and/or position or angle encoders. The system also comprises a computing device that is configured to determine, based on the measurement data, 3D coordinates of the measurement points, and for storing nominal data of the object in a data storage, the nominal data comprising nominal dimension data of the object for a pre-defined temperature. The nominal data comprises one or more expansion coefficients of the object. The coordinate measuring system comprises at least one temperature sensor that is configured to determine one or more actual temperature values of the object, e.g. an actual temperature distribution on the object or at least a part of the object, wherein the at least one temperature sensor is configured to generate temperature data based on the determined actual temperature values and to provide the temperature data to the computing device. The computing device is configured to determine, based on the determined 3D coordinates of the measurement points, on the provided temperature data and on the expansion coefficients, tempered coordinates of the object. The determined actual temperature values of the object deviate from the pre-defined temperature, and the tempered coordinates are 3D coordinates that the object would have at a tempered state in which the object uniformly has the pre-defined temperature.

According to some embodiments of the system, determining the tempered coordinates of the object comprises

- obtaining measurement point coordinates of one or more measurement points to be measured by the coordinate measuring device,
- identifying, in a numerical simulation model of the object, one or more neighboring nodes for each of the one or more measurement points,
- determining a node-based displacement vector for each neighboring node, and
- applying to each of the one or more measurement points either the node-based displacement vector of one neighboring node, e.g. of that neighboring node that has the shortest distance to the measurement point, or an interpolated displacement vector calculated from the node-based displacement vectors of a plurality of neighboring nodes, to generate temperature correction information for each of the one or more measurement points.

In one embodiment, the temperature correction information comprises temperature-corrected 3D coordinates, and for determining the tempered coordinates of the object, the computing device is configured to provide the temperature-corrected 3D coordinates to the coordinate measuring device to effect measurement of the one or more measurement points at the temperature-corrected 3D coordinates.

According to one embodiment, determining the tempered coordinates of the object comprises correcting 3D coordinates of the one or more measurement points measured by the coordinate measuring device using the temperature correction information.

According to another embodiment, determining the node-based displacement vector comprises using a numerical temperature simulation, e.g. a finite-element temperature simulation, to calculate an elongation value for a difference between the pre-defined temperature and one or more actual temperatures, for instance using a Nastran analysis.

According to another embodiment, identifying the corresponding or interpolated node for each of the one or more measurement points is based on the plurality of actual temperature values of the object, e.g. on an actual temperature distribution on at least a part of the object.

According to some embodiments of the system, the coordinate measuring device is a coordinate measuring machine (CMM) comprising a base, a probe head, a frame structure comprising a plurality of frame members and one or more actuators, and a control unit configured to control the actuators to move the probe head along a measurement path to approach a plurality of measurement points on the object. The frame members are arranged to movably connect the probe head to the base so that the probe head can approach an object that is positioned on the base, the movability of the probe head defining a working volume of the coordinate measuring machine.

In one embodiment, the control unit comprises the computing device (or vice versa).

In another embodiment, the control unit is configured to define the measurement path based on the determined deformation of the object.

In another embodiment, the control unit is configured to adapt the measurement path in real-time based on the determined deformation of the object.

According to one embodiment, the CMM comprises one or more fixations configured to fix a position and orientation of the workpiece on the base, and expansion coefficients of the fixations are considered by the computing device for determining the tempered coordinates.

According to another embodiment, the probe head comprises a contacting temperature sensor configured to approach and contact a plurality of surface points of the object to measure a temperature at each of the surface points and to generate contact temperature values for each of the surface points, wherein the computing device is configured to adjust the temperature data from the at least one temperature sensor using the contact temperature values.

In one embodiment, the contacting temperature sensor is included in a tactile stylus that is used for approaching the plurality of measurement points on the object.

In another embodiment, the control unit is configured to control the actuators to move the probe head along the measurement path to approach, both, the plurality of measurement points and the plurality of contacted surface points.

In another embodiment, each feature of the object that comprises at least one measurement point also comprises at least one contacted surface point.

In another embodiment, at least one contacted surface point is a measurement point, i.e. the contacted surface point and the measurement point have the same coordinates. For instance, the plurality of measurement points comprises the plurality of contacted surface points.

According to some embodiments of the system, the arrangement of sensors comprises at least one laser distance meter. For instance, the coordinate measuring device may be embodied as a laser tracker, as a laser scanner or as a geodetic surveying device.

In one embodiment, the coordinate measuring device comprises the at least one temperature sensor, particularly a thermal imaging temperature sensor that is configured to be directed to the object and to generate the temperature data in the form of one or more thermal images.

In another embodiment, the system is configured to determine 3D coordinates of the object in a production line, wherein the object is a specimen of a workpiece being produced in the production line.

According to some embodiments of the system, the at least one temperature sensor is a thermal imaging temperature sensor that is configured to be directed to the object or—if the coordinate measuring device is a CMM—to a working volume of the CMM, and to generate the temperature data in the form of one or more thermal images, wherein the computing device is configured to determine the tempered coordinates based on the thermal images.

In one embodiment, the coordinate measuring device is a CMM, and the thermal imaging temperature sensor is attached to a frame member or to a probe head of the CMM and movable relative to a base of the CMM.

In one embodiment, the coordinate measuring device is a CMM, and the thermal imaging temperature sensor is configured to determine the actual temperature values continuously and to generate a plurality of sets of temperature data based on the continuously determined actual temperature values, wherein each set of temperature data is provided to the computing unit referenced to a position of a probe head of the CMM.

According to some embodiments of the system, the at least one temperature sensor is configured to determine the actual temperature values continuously and to generate a plurality of sets of temperature data based on the continuously determined actual temperature values, wherein each set of temperature data is provided to the computing device in real time, together with a time-stamp, and/or referenced to the measurement data.

In one embodiment, the set of temperature data comprises one or more thermal images. In another embodiment, the coordinate measuring device is a CMM, and each set of temperature data is provided to the computing device referenced to a position of a probe head of the CMM.

According to some embodiments of the system, the at least one temperature sensor is configured to determine the actual temperature values synchronously with the generation of the measurement data by the arrangement of sensors, e.g. so that the actual temperature values are determined while the 3D coordinates of the measurement points are determined.

According to some embodiments of the system, the computing device is configured to determine a deformation of the object based on the provided temperature data and on the expansion coefficients, the deformation being in relation to a condition of the same object having the pre-defined temperature.

In one embodiment, determining the tempered coordinates is based on the determined 3D coordinates and on the determined deformation.

According to some embodiments of the system, the computing device is configured to determine, based on the tempered coordinates, deviations of the object at the defined temperature from the nominal dimension data.

According to some embodiments of the system, the computing device is configured to use artificial intelligence to enhance unsatisfactory temperature data provided by the at least one temperature sensor, e.g. wherein the provided temperature data is a sparse point cloud or comprises gaps. This temperature data is enhanced to obtain an enhanced temperature distribution, e.g. as a dense point cloud, for instance by filling gaps or interpolating the temperature values. The tempered coordinates are then determined also based on the enhanced temperature distribution.

According to some embodiments, the system comprises at least one attachable temperature sensor that is configured to be attached to surface points of the object to measure a temperature at the surface points and to generate contact temperature values for the surface points. The computing device is configured to adjust the temperature data from the at least one temperature sensor using the contact temperature values, for instance wherein the attachable temperature sensor is connected with the computing device by means of a cable and/or a wireless data connection.

According to some embodiments of the system, the system comprises a contacting temperature sensor and/or at least one attachable temperature sensor for measuring temperatures at surface points of the object, and the at least one temperature sensor is configured to determine the one or more actual temperature values of the object by means of infrared measurement, for instance being a thermal imaging temperature sensor. According to these embodiments, the contact temperature values for the surface points are used to calibrate or correct the one or more actual temperature values of the object measured by the at least one temperature sensor.

In one embodiment, the surface points are defined for determining an emissivity and/or a reflectivity of the related surface, wherein defining the surface points comprises detecting reflective surfaces on the object using the nominal dimension data, material information of the object and/or the temperature data from the one or more thermal imaging temperature sensor.

In another embodiment, the at least one temperature sensor is configured to move relative to the object while determining one or more actual temperature values of the same surface of the object by means of infrared measurement, and the computing device is configured to determine an emissivity and/or a reflectivity of said surface and to correct, based on the determined emissivity and/or reflectivity, one or more actual temperature values on said surface using the contact temperature values.

A second aspect of the present disclosure pertains to a computer-implemented method for determining 3D coordinates of an object, e.g. using a coordinate measuring system according to the first aspect of the disclosure. The method comprises

- measuring 3D coordinates of an object using a coordinate measuring device, wherein, during the measurement, one or more actual temperatures of the object deviate from a pre-defined temperature;
- measuring the one or more actual temperatures of the object using at least one temperature sensor; and
- determining, based on the measured 3D coordinates, on the measured one or more actual temperatures and on one or more expansion coefficients of the object, tempered coordinates of the object, wherein the tempered coordinates are 3D coordinates that the object would have at a tempered state in which the object uniformly has the pre-defined temperature.

According to some embodiments of the method, determining the tempered coordinates of the object comprises

- obtaining measurement point coordinates of one or more measurement points to be measured by the coordinate measuring device,
- identifying, in a numerical simulation model of the object, one or more neighboring nodes for each of the one or more measurement points,
- determining a node-based displacement vector for each neighboring node, and
- applying to each of the one or more measurement points either the node-based displacement vector of one neighboring node, e.g. of the neighboring node having the shortest distance to the measurement point, or an interpolated displacement vector calculated from the node-based displacement vectors of a plurality of neighboring nodes, in order to generate temperature correction information for each of the one or more measurement points.

In one embodiment, the temperature correction information comprises temperature-corrected 3D coordinates, and for determining the tempered coordinates of the object, the 3D coordinates of the object are measured at the temperature-corrected 3D coordinates.

In another embodiment, determining the tempered coordinates of the object comprises correcting 3D coordinates of the one or more measured measurement points using the temperature correction information.

In another embodiment, determining the node-based displacement vector comprises using a numerical temperature simulation, e.g. a finite-element temperature simulation, to calculate an elongation value for a difference between the pre-defined temperature and one or more actual temperatures, for instance using a Nastran analysis.

In another embodiment, identifying the neighboring node for each of the one or more measurement points is based on the one or more actual temperature values of the object, e.g. on an actual temperature distribution on at least a part of the object.

According to some embodiments, the method comprises determining a deformation of the object based on the provided temperature data and on the expansion coefficients, the deformation being in relation to a condition of the same object having the pre-defined temperature.

In one embodiment, determining the tempered coordinates is based on the measured 3D coordinates and on the determined deformation.

In another embodiment, a measurement path for a probe head of the coordinate measuring device, e.g. being a CMM, is defined based on the determined deformation of the object.

In another embodiment, a measurement path for a probe head of the coordinate measuring device, e.g. being a CMM, is adapted in real-time based on the determined deformation of the object.

A third aspect of the disclosure pertains to a computer programme product comprising programme code which is stored on a machine-readable medium, or being embodied by an electromagnetic wave comprising a programme code segment, and having computer-executable instructions for performing, particularly when executed on a computing device of a coordinate measuring system according to the first aspect, the method according to the second aspect of the disclosure.

BRIEF DESCRIPTION OF THE DRAWINGS

The disclosure will be described in detail by referring to exemplary embodiments that are accompanied by figures, in which:

FIG. 8 shows a flowchart illustrating a prior art method;

FIG. 9 shows a flowchart illustrating an exemplary embodiment of a method;

DETAILED DESCRIPTION

Figure 1A:
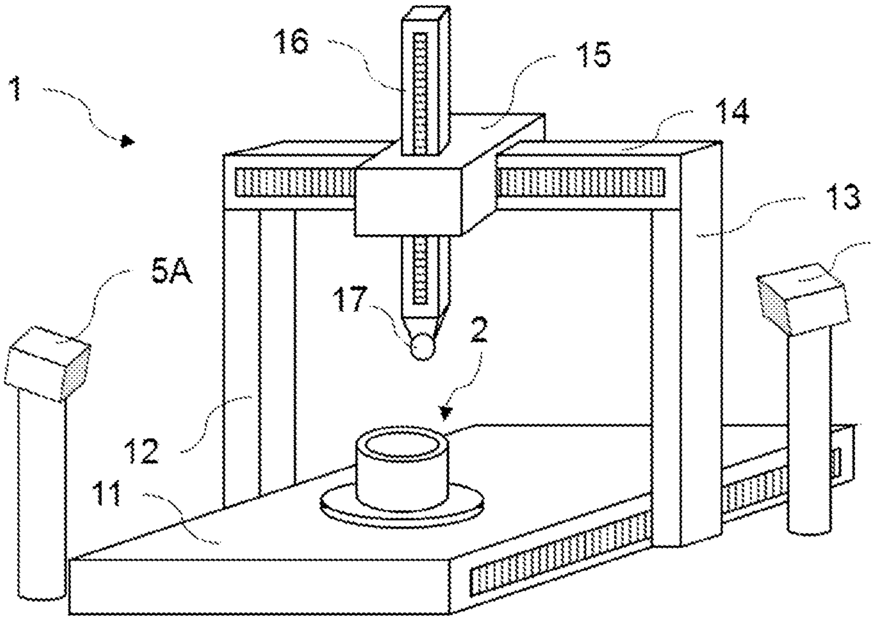
FIG. 1*a* shows an exemplary embodiment of a coordinate measuring machine (CMM) as a part of a first exemplary embodiment of a coordinate measuring system, the CMM comprising two thermal imaging temperature sensors.
Figure 1B:
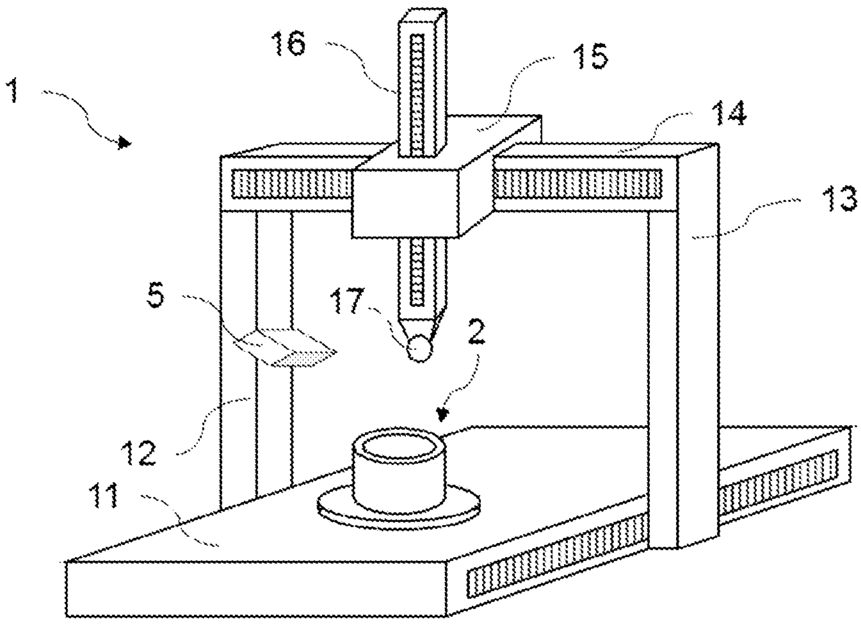
FIG. 1*b* shows another exemplary embodiment of a of a CMM as a part of a second exemplary embodiment of a coordinate measuring system, the CMM comprising a movable thermal imaging temperature sensor.

In FIGS. 1*a* and 1*b*, two exemplary embodiments of coordinate measuring machines (CMM) are shown that comprise at least one temperature sensor to determine temperatures of an object being measured by the CMM. Both CMMs are a portal bridge CMMs, wherein a probe head linked by a frame structure to a base on which a workpiece as an object to be measured is positioned. The frame structure comprises several members that are movable with respect to one another, so that the probe head is supported by the members for movement relative to the base along three mutually perpendicular axes.

In detail, the CMM 1 comprises a base 11, on which the frame structure is arranged. As a member of the frame structure a portal is arranged so that it can be moved in a first, longitudinal direction. The portal has two portal legs 12, 13, which are connected at their upper ends by a bridge 14 as further member of the frame structure. A carriage 15, which can be driven along the bridge 14 in a second direction is positioned on the bridge. A ram 16 positioned at the carriage 15 can be moved in a third direction. The three directions are preferably orthogonal to one another, although this is not necessary.

A probe head 17 is fastened on the lower free end of the ram 16. The probe head 17 may be designed for arranging a contact probe, e.g. a scanning or touch trigger probe, or a non-contact probe, particularly an optical, capacitance or inductance probe. The CMM 1 is designed for determination of three spatial coordinates of a measurement point in a working volume of the CMM 1, i.e. on an object 2 to be measured that is positioned in the working volume, e.g. on the base 11. The CMM 1 comprises three linear drive mechanisms for providing movability of the probe head 17 relative to the base 11 in the first, second and third directions (X, Y and Z direction). Each linear drive mechanism has a linear guide, one in the first, one in the second and one in the third direction, respectively. Moreover, each linear drive mechanism comprises a linear measuring instrument for determination of a first, a second or a third drive position, respectively, of each movable member in the first, the second or the third direction.

In the first embodiment of FIG. 1*a*, the CMM 1 comprises two fixedly installed temperature sensors 5A, 5B that are positioned and oriented to capture temperature data of an object 2 positioned within the working volume of the CMM 1, e.g. on the base 11. In the second embodiment of FIG. 1*b*, the CMM 1 comprises a temperature sensor 5 that is provided on a movable member (leg 12) of the CMM 1 and is, thus, movable relative to the base 11 and the object 2 positioned thereon. The temperature sensors 5, 5A, 5B are embodied as thermal imaging temperature sensors, for instance as thermographic cameras configured to create thermal images using infrared (IR) radiation. For instance, the sensors 5, 5A, 5B may be sensitive to wavelengths from about 1 μm to about 14 μm.

The described embodiments can be used in combination with any coordinate measurement method that is suitable for determining 3D coordinates of an object. The described embodiments are therefore not restricted to a CMM in the portal bridge design as shown here, but may generally be used for all types of coordinate measuring devices. For instance, it may equally be used for coordinate measuring machines in gantry design in which only the bridge with two supports, functioning as very short feet, can travel along two highly placed fixed rails, or a CMM being designed as parallel-kinematics machine as well as for a CMM having linear or serial kinematics. For instance, the CMM may be designed in bridge-type, L-bridge-type, horizontal-arm-type, cantilever-type or gantry-type. Also, the coordinate measuring device may be or comprise a laser scanner, a laser tracker or one or more time-of-flight (TOF) cameras. Additionally, the coordinate measuring device may be part of another machine, e.g. a processing machine in which the workpieces are produced or processed.

Figure 2B:
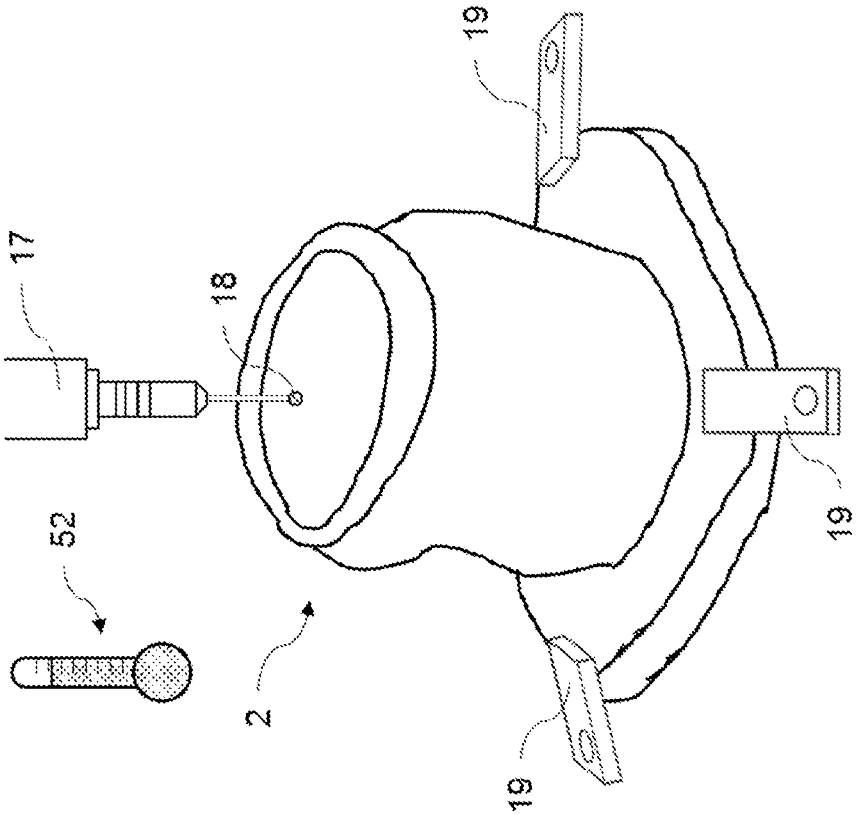
FIG. 2*b* shows the workpiece of FIG. 2*a* having a temperature that deviates from the pre-defined temperature and being deformed due to the deviation.
Figure 2A:
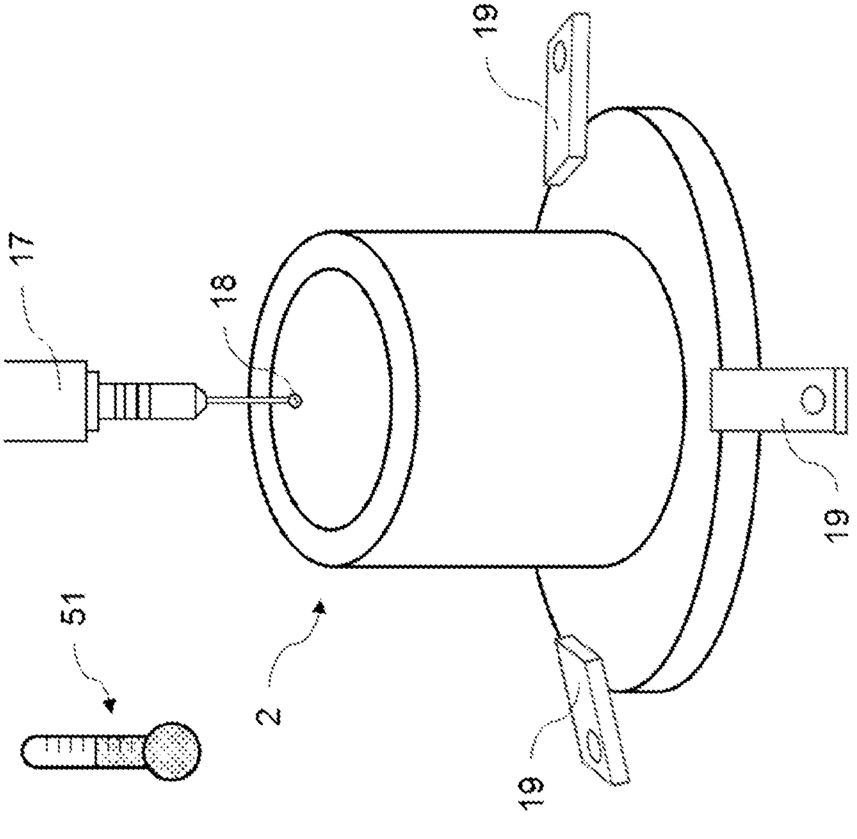
FIG. 2*a* shows an exemplary workpiece being measured by a CMM, the workpiece having a uniform temperature that a pre-defined temperature.

FIGS. 2*a* and 2*b* show a workpiece 2 being fixed by means of three fixtures 19 to the base of the CMM and being measured by means of a tactile stylus 18 attached to the probe head 17 of the CMM. The fixation enhances the measuring accuracy and is advantageous where highly precise measurements are required. However, depending on the type and material of the fixations, these may strongly influence the temperature development of the workpiece 2, particularly of the sections or components at which the workpiece is fixed.

In FIG. 2*a*, the workpiece 2 is measured at a first temperature 51, which is a "normal temperature" pre-defined by nominal data of the workpiece, in which normal temperature the workpiece 2 has defined nominal dimensions. The normal temperature may be a room temperature, e.g. being defined as 20° C. Measuring the workpiece 2 at this normal temperature 51, the determined 3D coordinates may be used directly to compare them with nominal dimensions of the workpiece 2.

In FIG. 2*b*, the same workpiece 2 is measured while having a second temperature 52 (e.g. a second inhomogeneous temperature field), which deviates from the defined "normal temperature" 51. For instance, the workpiece 2 that has just been produced is still hot from its last processing steps. Due to different thermal expansion coefficient(s) of the materials of the workpiece, the dimensions of the workpiece 2 may differ significantly from those that the same workpiece would have at the normal temperature. Also, the temperature distribution may be irregular and patchy, since some parts may cool down faster than others. It should be noted that the deformations of the workpiece 2 shown in FIG. 2*b* are depicted in an exaggerated manner for means of clarification. Due to these resulting deformations, the 3D coordinates determined by measuring the workpiece 2 at this second temperature 52 cannot be used directly to compare them with nominal dimensions of the workpiece 2.

Figure 3:
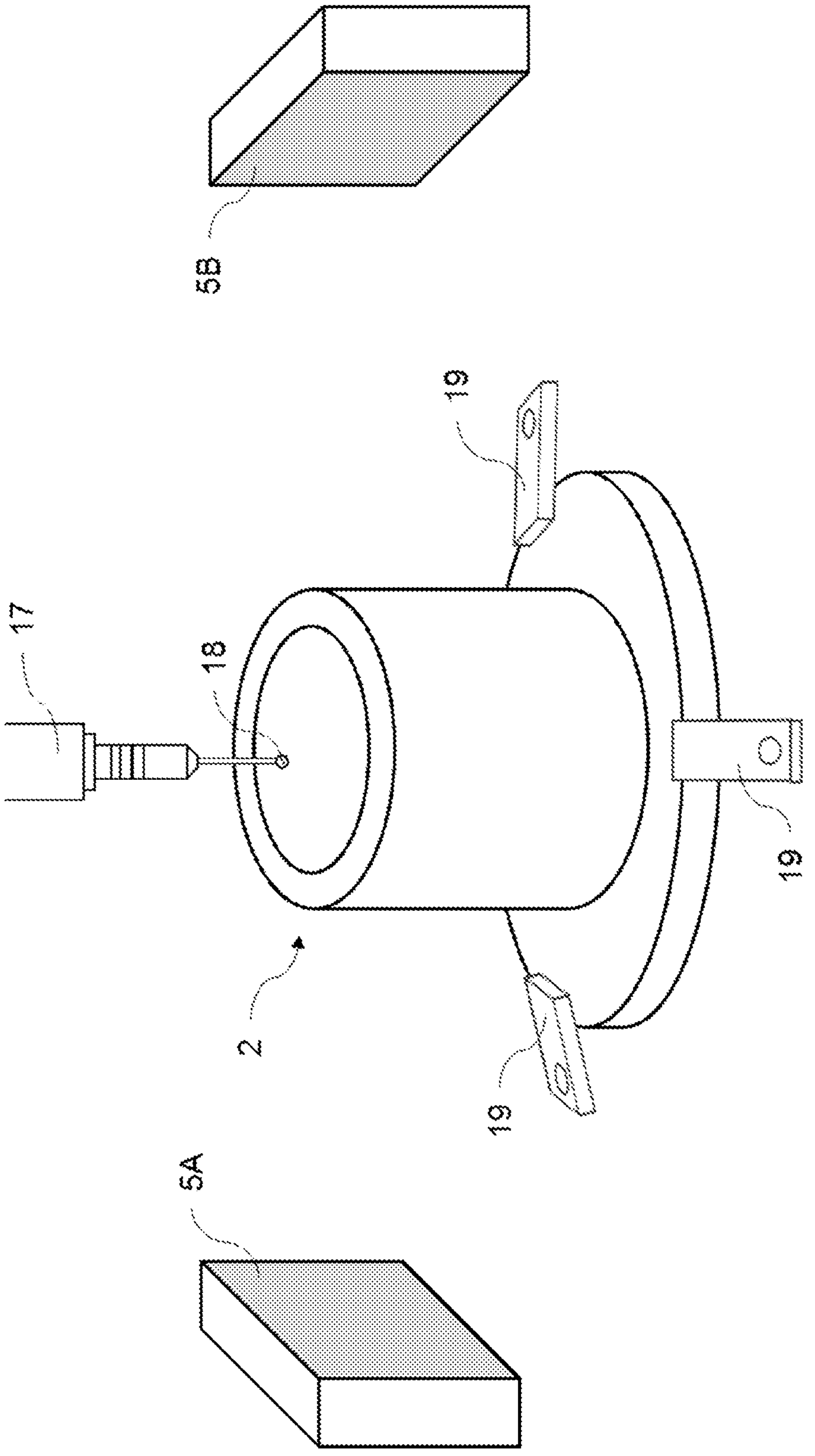
FIG. 3 shows the workpiece of FIG. 2*a* being fixed to the CMM and two thermal imaging temperature sensors measuring temperatures of the workpiece.

In FIG. 3, two thermal imaging temperature sensors 5A, 5B measure temperatures of the workpiece 2 while it is being measured by the coordinate measuring device, e.g. the CMM of FIG. 1*a*. Temperatures and their distribution on the workpiece 2 are measured continuously and at a multitude of points of the workpiece simultaneously.

Using computer-aided engineering (CAE), e.g. finite element method (FEM), the known workpiece 2 is virtually meshed, and a virtual model, e.g. an FEM model, is generated. The model comprises all relevant physical information, e.g. temperature distribution (whether homogeneous or discontinuous), material information (thermal expansion coefficient, mass) and other information regarding loadings, e.g. by fixations such as clamping. The user may additionally define relevant material parameters, e.g. the expansion coefficient(s) of the workpiece. Alternatively, information regarding the materials and their 3D distribution in the workpiece 2 may be provided together with CAD data (or other 3D model data) of the workpiece.

The manner in which the workpiece is fixed on the machine and temperature conditions, e.g. expansion coefficients, of the fixtures 19 and the base on which the workpiece is fixed can also be known. If the workpiece 2 is fixed as shown here, preferably, the fixation 19 and its heat dissipation or heat addition are defined and determined accordingly. A type and position of the fixation 19 may be determined automatically or provided as a user input. The base and other relevant parts of the CMM can also be modelled. The initial temperature distribution of the workpiece and optionally also the initial temperature distribution of the base can be defined in the virtual model. If the fixation 19 is also taken into account, the deformed state of the workpiece 2 due to the inhomogeneous temperature distribution is determined at the beginning by transferring the temperature distribution at the measured points to the virtual model.

The temperature distribution on the workpiece 2 is then determined by appropriate spatial interpolation at all nodes of the model. Subsequently, a deformation state can be determined using the FEM model and a corresponding solver (e.g. Nastran). A mean temperature of the coordinate measuring device or of its surroundings can be used as the reference temperature. Alternatively, the reference temperature can be defined according to standards or norms, e.g. of the workpiece or the manufacturing process.

Optionally, initial deformations of the base on which the workpiece 2 is positioned can be determined in the same way. Taking the fixation 19 into account comprises setting corresponding nodes in the models or connecting them to the base. If the base is part of the model, it is assumed that its deformation state defines the nodal points of the fixation or impresses them on the workpiece.

During the actual geometric measuring process, the temperature status of the workpiece 2 (and optionally the base) is recorded continuously and at several points. These conditions are transferred to the FEM model. The temperature distribution on the workpiece 2 and optionally the base at each node is estimated via spatial interpolation.

If the fixation 19 is taken into account, the change to the initial state (i.e. shortly before or after fixation) is determined. Otherwise, i.e. if the fixation 19 is not taken into account, the deformation is attributed either to the average machine status or according to standards and norms based on the absolute temperature distribution via FEM simulation. If the fixation 19 is taken into account, the changed deformation status due to the temperature change at the beginning and the fixation 19 is subtracted from the initial deformation state and then also returned to the mean machine state or according to standards and norms.

This specific and virtual deformation state can then be used to compensate for measurement or processing errors or to trace them back to the standards and norms.

Thereby, the relevant points on the workpiece 2 in terms of measurement are used. The deformation state is spatially interpolated on these points and subtracted accordingly from the measurement. Thus, the user receives measurement results that are calculated back to the reference temperature, i.e. an average machine temperature or defined standards.

If the temperature changes over time, some or all measurements can be repeated periodically. Alternatively, similar measurements can be taken at similar locations. This information, together with the changed temperature values and the specific deformation states over time, enable the simulation to be optimized. Parameters can be adapted, for example the expansion coefficient, modelling details of the fixation, so that the estimated changed deformation state better matches the estimated measurement states.

Ideally, the improved simulation model can now be used to re-determine all deformation states, including the initial state, and to correct the measurement and processing. If this is not possible, the corrected model is used from the respective point in time. The model can then be continuously improved.

The more temperature measuring points there are and can be transferred to the model as input, the closer the estimated deformations come to reality. In order to enhance the number of temperature measuring points, it is advantageous to use non-contact temperature measuring methods such as thermal imaging cameras. However, these are dependent on the corresponding workpiece properties, i.e. emission coefficient in the infrared range, and on the environmental influences such as reflections on the surfaces of the workpiece.

Non-contact temperature measurements can thus be inaccurate and negatively affect the quality of the deformation state condition. However, the non-contact temperature measurements can be improved autonomously by measuring temperatures at certain points of the workpiece in a standard contacting manner and by contactless temperature measuring at the same points or at similar positions on the workpiece. In this manner, parameters of the contactless measurement can be adjusted in such a way that the above-mentioned influences from the workpiece itself or from the environment are taken into account, so that the contactless measurement provides measurement values with a higher precision. For example, the effective emission coefficient of the workpiece can be determined. The emissivity of a surface depends on the nature of the surface and its material. For instance, rough surfaces have a higher emissivity.

Workpiece surfaces that are prone to temperature reflections due to their reflection properties and/or due to their orientation relative to an external heat source may be identified automatically. Then, contacting temperature measurement can be focussed on such surfaces. For instance, metal surfaces of the workpiece 2 may be detected using the nominal 3D data and material information of the workpiece 2, and, workpiece surfaces that are oriented with a critical angle relative to an external heat source may be identified using the orientation of the workpiece 2 and the positions of the known heat sources relative to the CMM. Emission, absorption and reflection are interconnected properties of a surface, so that an emission coefficient of a surface can be derived from a detected temperature reflection and vice versa.

Thus, the emissivity of a certain surface can be determined using the contacting temperature measurements. The determined emissivity can then be used to improve (e.g. correct) the infrared temperature measurements, especially if the determined emissivity exceeds a predefined value, typically about 0.6. If the value is smaller (e.g. <0.6), there is generally a risk of measuring temperature reflection of the environment and determining environmental temperature instead of object temperature. In this case, the temperatures measured by means of infrared sensors for such a surface might be ignored instead of corrected.

For instance, such temperature reflections can be identified by moving the thermal image sensor relative to the object and capturing more than one thermal image of the same surface. If the temperature image changes when the thermal image sensor is moved in relation to the surface, this indicates the presence of reflections. Thus, reflections can be detected and filtered out using such relative movement and a post-processing step, which might also use AI techniques.

Figure 10:
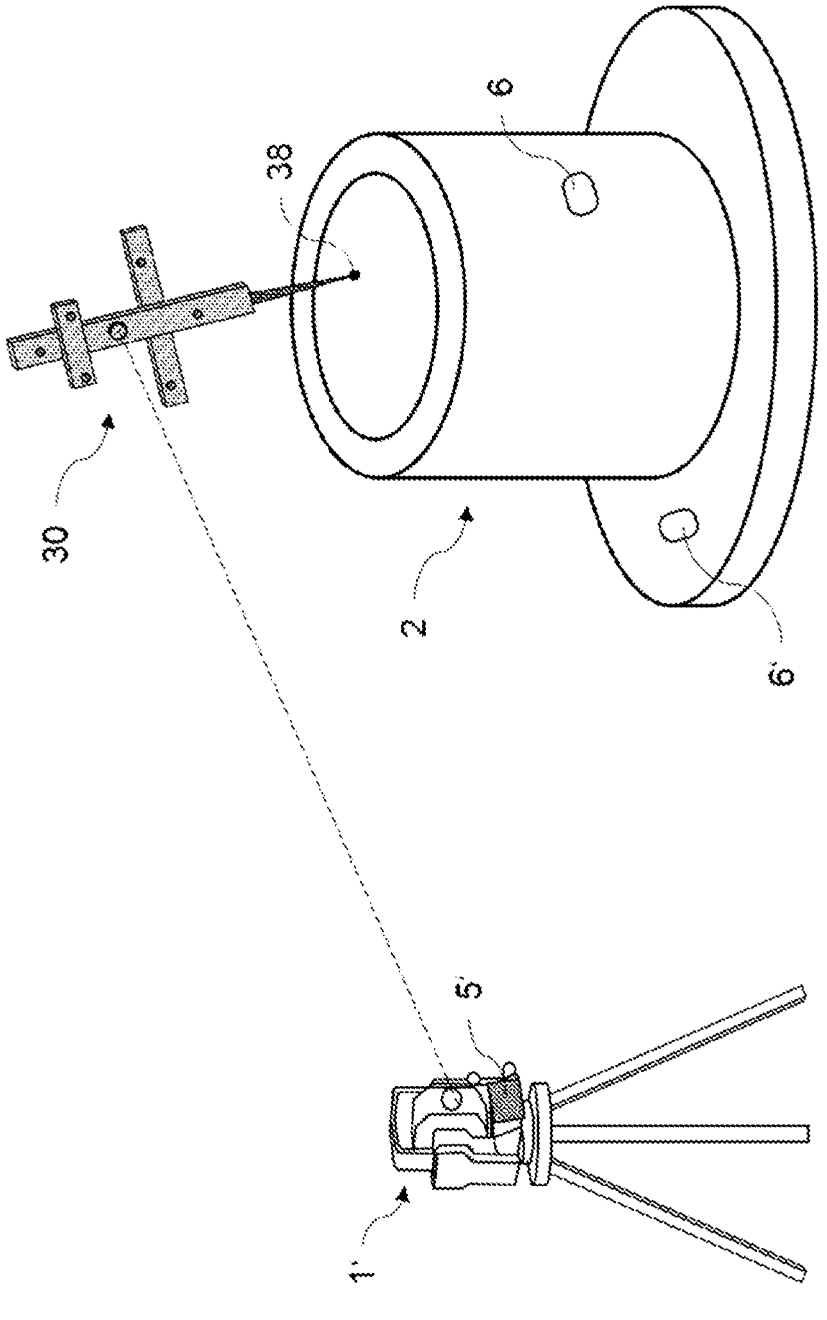
FIG. 10 shows a laser tracker as a part of a third exemplary embodiment of a coordinate measuring system measuring a workpiece.

The optional contacting temperature measurement may be performed either by a special stylus attached to the probe head 17 (e.g. by means of a magnet) or by a combined stylus that is attached to the probe head 17 and used for measuring, both, 3D coordinates and temperatures of the workpiece 2. Alternatively, as shown in FIG. 10, attachable temperature sensors may be used.

Alternatively or additionally, methods utilizing artificial intelligence (AI) can help to quickly consider temperature states that deviate from determined states. The local temperature allocation can be carried out using an AI-based evaluation of the thermal images. This may include adapting local emission values or eliminating reflections in the images. The local temperature information obtained is then transferred to a finite element model. An AI system may be trained by simulation results (thermal expansions) for discrete temperature distributions which provide the data basis. Then, an AI can predict simulation results for temperature states that deviate from the trained basis data.

Figure 4:
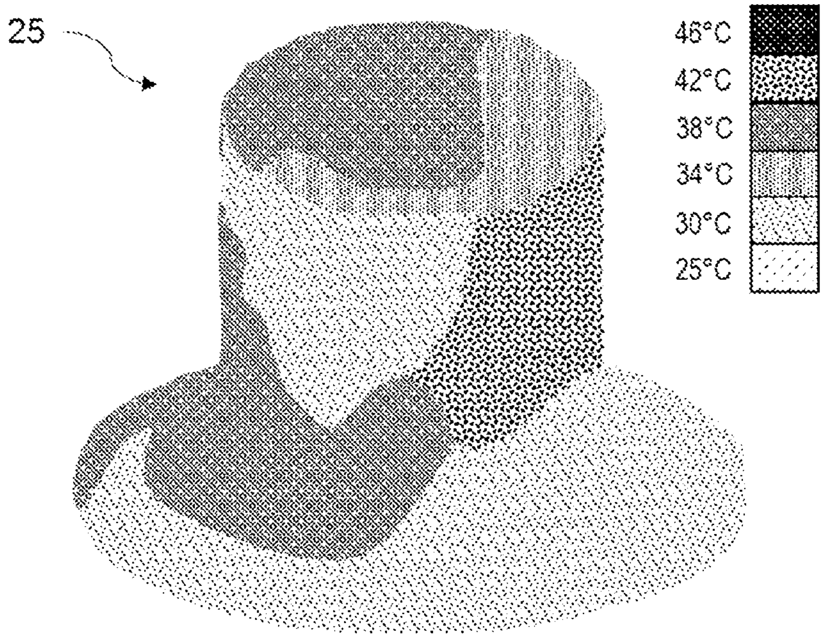
FIG. 4 shows an exemplary thermal image of the workpiece of FIG. 3.

A complete thermal image of the workpiece 2 may be generated by means of a temperature simulation (see FIG. 4). From this, in turn, the temperature-dependent shift image is obtained. Measurement points on the workpiece can either be mapped exactly or approximately. Finally, the temperature-related displacement vector is available for all measuring points on the workpiece.

For all measuring points of the measurement, the temperature-related displacement vector is stored in the software of the measuring machine and can be automatically taken into account (i.e. compensated) during the measurement.

FIG. 4 shows an exemplary thermal image 25 of the workpiece captured by one of the thermal imaging temperature sensors 5A, 5B of FIG. 3 being embodied as a thermographic camera. Each colour (pattern) of the image 25 represents a different temperature. In this example the measured temperatures range from 42° C. to 30° C., thereby deforming different parts of the workpiece in different ways. The higher the resolution of the thermal images 25, the better the resulting deformation can be calculated.

Figure 5:
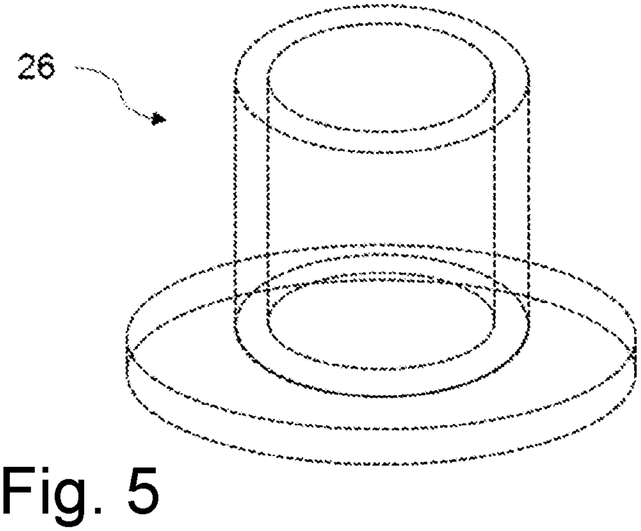
FIG. 5 shows nominal dimensional data of the workpiece.

FIG. 5 shows nominal dimensional data 26 of the workpiece, for instance computer-aided design (CAD) data. The nominal dimensional data 26 describes the nominal dimensions of the workpiece at the normal temperature, i.e. of a tempered workpiece.

Figure 6:
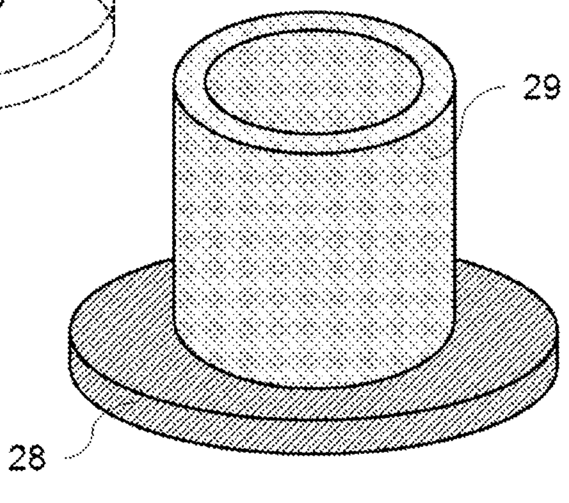
FIG. 6 shows the workpiece being composed of different materials, each material having a different expansion coefficient.

According to some embodiments, the nominal data also comprises information about expansion coefficients of the workpiece. In the example of FIG. 6, the workpiece comprises two different materials 28, 29, each having a known expansion coefficient that is provided in the nominal data. It is thus known—at least for a span of likely temperatures—by how much each part of the workpiece expands when having a certain temperature. In combination with the measured temperatures, e.g. from the thermal image 25 of FIG. 4, the expansion coefficients can be used to calculate a deformation of the workpiece relative to its nominal dimensions as provided in the nominal dimensional data 26 of FIG. 5. Also, after a measurement, measured coordinates of measurement points on the (untempered) workpiece can be corrected by calculating a deformation of the workpiece relative to its nominal dimensions, based on the expansion coefficients and the thermal image.

Figure 7B:
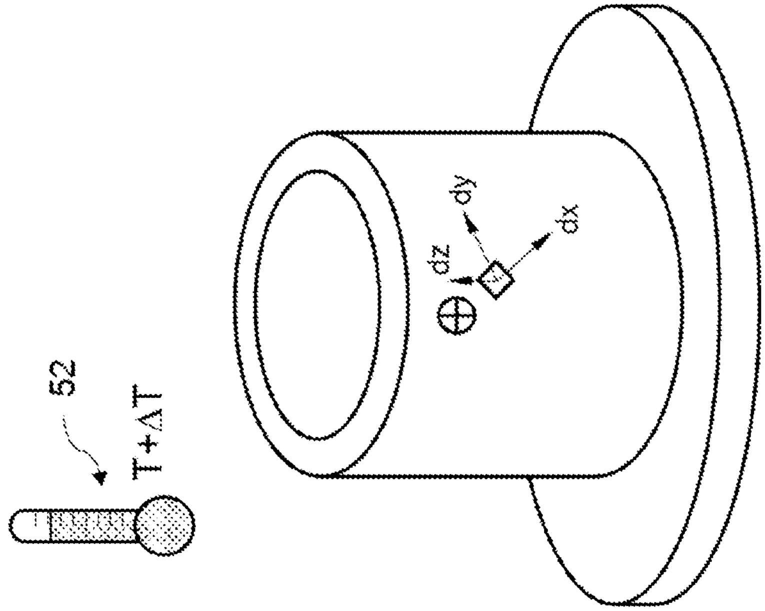
FIG. 7*b* shows the measurement point and node of FIG. 7*a*, wherein the node comprises deflection information related to a temperature of the workpiece.
Figure 7A:
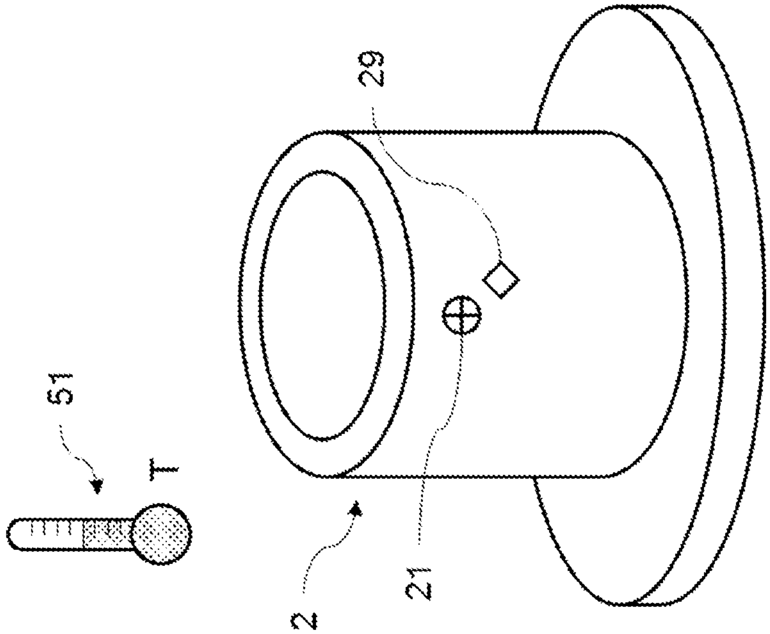
FIG. 7*a* shows a measurement point on the workpiece, the measurement point being associated with a node in a model of the workpiece.

FIGS. 7*a* and 7*b* illustrate the use of a finite-element temperature simulation to calculate elongation values for any temperature difference ΔT between an actual temperature 52 and a pre-defined normal temperature 51. Instead of the illustrated finite-element temperature simulation, also other numeric temperature simulations can be used.

In FIG. 7*a*, the object 2 has the normal temperature 51. A measurement point 51 reflects the coordinates for the normal temperature 51. The FEM model comprises a multitude of FE nodes, wherein the FE node 29 is the closest to the measurement point 21. Preferably, the number of nodes in the FEM model is sufficiently high so that the positional difference between node 29 and measurement point 21 is negligible. Each FE node may be assigned a displacement vector for a plurality of temperatures or temperature differences ΔT, e.g. wherein the displacement vector for a temperature difference ΔT of zero (i.e. the normal temperature 51) is zero. These displacement vectors may be provided as a lookup table.

FIG. 7*b* shows the same object 2 with the same measurement point 21 and the same FE node 29. However, the object 2 has an actual temperature 52 that differs from the pre-defined normal temperature 51 (T+ΔT). This temperature difference ΔT causes a displacement vector on the node 29 ($d_x$, $d_y$, $d_z$). Since the positional difference between node 29 and measurement point 21 is negligible, the same displacement vector is valid for the measurement point 21 and can be used to compensate the coordinate measurement. Under the conditions of T+ΔT (i.e. at the temperature 52), the displacement vector caused by ΔT can be subtracted from the measured value at measurement point 21 to get the measurement results that would apply at the normal temperature 51.

For performing this method, the temperature of the workpiece 2 preferably should be constant or basically constant. After the temperature of the workpiece has been determined, the method 200 starts with reading defined measurement point coordinates from a measurement plan (step 230). Next, corresponding or neighboring nodes are found 240 in the FE model for each of the defined measurement point coordinates. A Nastran analysis (or an analysis using a different solver) is performed 250 with n constant temperature loadings. Displacement results for the these nodes are filtered 260 and temperature-dependent displacement vector tables are written 270 for these nodes. Then, the coordinate measurement is performed 280 at the pre-defined measurement point coordinates using the temperature correction information.

Instead of using the displacement vectors from a single node 29 as shown here, also an interpolation can be performed for a plurality of neighboring nodes, i.e. those nodes of the model that are closest to the measurement point 21. This allows calculating an "interpolated node" with interpolated displacement vectors for the measurement point 21 from displacement vectors of, e.g. three or four, neighboring nodes. This is especially useful if the node density in the model is not high enough to neglect the positional difference between the measurement point 21 and the nearest node 29.

FIG. 8 shows a flowchart illustrating a prior art method 100' for determining 3D coordinates of an object. The method starts with tempering 101 the object in order to bring it to the pre-determined "normal temperature" in order to eliminate workpiece deformations due to the influence of temperature. Tempering the workpiece may include storing it in a tempered, e.g. air-conditioned, room having exactly the desired normal temperature, and waiting until the workpiece assumes the surrounding temperature.

When the object has been tempered, it is positioned in a CMM—which may also be positioned in the tempered room—and 3D coordinates of measurement points on the workpiece are measured 102. The measured coordinates can then be compared with nominal data of the workpiece to determine 103 whether there are significant deviations.

This conventional approach has the disadvantage of a long waiting time until the temperatures in the workpiece are equalized to the normal temperature. This adjustment time depends, amongst other things, on the initial temperatures in the workpiece and on the heat inertia of the workpiece. Since tempering a workpiece may thus take a long time before a measurement can be made, it would be desirable to reduce the waiting time.

FIG. 9 shows a flowchart illustrating an exemplary embodiment of a computer-implemented method 100, wherein the step of tempering the object (e.g. workpiece) is not needed.

Instead, in a first step of the method, 3D coordinates of an "untempered" object are measured 110 by means of a CMM. Since the object may be distorted, these coordinates cannot be used directly. Consequently, during the coordinate measurement 110 in the CMM, a multitude of temperatures of the untempered object are measured by means of one or more thermal imaging temperature sensors. Preferably, these temperature measurements 120 comprise a continuous monitoring of a temperature distribution on the surfaces of the workpiece.

Based on known expansion coefficients of the workpiece (e.g. provided together with the nominal data) and on the measured 120 temperatures, a deformation of the untempered workpiece can be determined 130, i.e. the deformation relative to the form the same workpiece would have if it would have been tempered.

Based on the measured 3D coordinates and on the determined deformation (or, alternatively, directly on the measured temperatures and expansion coefficients), 3D coordinates may be determined 140 that the workpiece would have if it would have been tempered. The determined 140 coordinates can then be compared with nominal data of the workpiece to determine 150 whether there are significant deviations from design.

The steps 130, 140 and 150 can be performed by an algorithm, which uses as input at least the initially measured temperatures of the object and the distribution of expansion coefficients in the measured object, wherein the distribution of expansion coefficients may be derived from information of a distribution of materials in the measured object and the properties of these materials, including the expansion coefficients.

In one embodiment, using computer-aided engineering (CAE), e.g. finite element method (FEM), the known workpiece is virtually meshed, wherein the user additionally defines relevant material parameters, e.g. the expansion coefficient(s) of the workpiece. The fixation and its heat dissipation or heat addition are defined and determined accordingly.

The base and other relevant parts of the machine can also be modelled. The initial temperature state of the workpiece is defined—optionally also the initial temperature state of the base can be defined.

If the captured temperature data is not sufficient to determine a deformation of the object with sufficient accuracy, the data optionally may be enhanced using artificial intelligence (AI), e.g. using FEM simulations. For instance, if the captured temperature data comprises too few temperature measurement points, e.g. is only provided as a sparse point cloud or has gaps at important object features, the AI, having access to the object's nominal data including the materials and structures of the object, may interpolate the temperature data, taking into account the object's nominal data to generate a denser point cloud of temperature values or fill the gaps, FIG. 10 shows another exemplary embodiment of a coordinate measuring system measuring a workpiece 2. Instead of the CMM shown in FIGS. 1*a* and 1*b*, the coordinate measuring device performs laser-based distance measurements for determining 3D coordinates of the workpiece 2. Such a device may be a laser scanner or a geodetic or industrial surveying instrument. In the show example, the coordinate measuring device is a laser tracker 1' that determines a distance to a retroreflector of a measuring aid 30 using a laser distance meter. The laser tracker 1' determines a pose of the measuring aid 30 using a camera to determine a distribution of light points of the measuring aid 30 in an image of the camera. Based on the determined distance and pose, a 3D position of a measuring tip 38 of the measuring aid 30 can be determined, so that the measuring aid 30 can be used to measure points on the workpiece 2. The laser tracker 1' is adapted to track the movements of the measuring aid 30 so that the laser beam of the laser distance meter stays locked on the retroreflector.

In the shown embodiment, the laser tracker 1' comprises a thermal imaging temperature sensor 5' to measure temperatures of the workpiece 2 while it is being measured using the tracked measuring aid 30. Temperatures and their distribution on the workpiece 2 are measured continuously and at a multitude of points of the workpiece simultaneously, e.g. as described with respect to FIG. 3. The known workpiece 2 is virtually meshed, and a virtual model is generated. The temperature distribution on the workpiece 2 is then determined by appropriate spatial interpolation at all nodes of the model. Subsequently, an initial deformation state can be determined with the help of the model and a corresponding solver (e.g. Nastran). A mean temperature of the measuring device or of its surroundings can be used as the reference temperature. For instance, a temperature sensor may be integrated into the measuring aid 30.

In contrast to the situation shown in FIG. 3, in FIG. 10 only one thermal imaging temperature sensor 5' is provided, so that some parts of the workpiece 2 cannot be imaged in a thermal image of the thermal imaging temperature sensor 5'. This problem may be overcome by positioning one or more further temperature sensors, or by positioning one or more mirrors with known shapes, positions and poses to capture the otherwise hidden parts of the workpiece 2.

Alternatively or additionally, gaps in the temperature distribution data of the workpiece surface may be filled computationally. For instance, this may comprise one or more of the following:

- using classical interpolation and extrapolation techniques, e.g. linear, bilinear or cubical;
- using look-up tables, e.g. generated from previously performed complete measurements;
- using AI models that allow generating a complete image from a reduced input;
- using complex FEM models that derive the distribution from an optimization step of the model; or combining AI and FEM models, i.e. using complex FEM simulations to simulate data sets of assumed temperature distributions and to train an AI model that estimates the complete distribution from an incomplete distribution.

As described with respect to FIG. 3, non-contact temperature measurements can be improved by measuring temperatures at certain points of the workpiece in a standard contacting manner and by contactless temperature measuring at the same points or at similar positions on the workpiece. In the embodiment shown in FIG. 10, workpiece surfaces that are prone to temperature reflections due to their reflection properties and/or due to their orientation relative to an external heat source may be equipped with contacting temperature sensors 6, 6'. Alternatively, the contacting temperature measurement may also be performed by a temperature sensor integrated into the measuring tip 38 of the measuring aid.

Figure 11A:
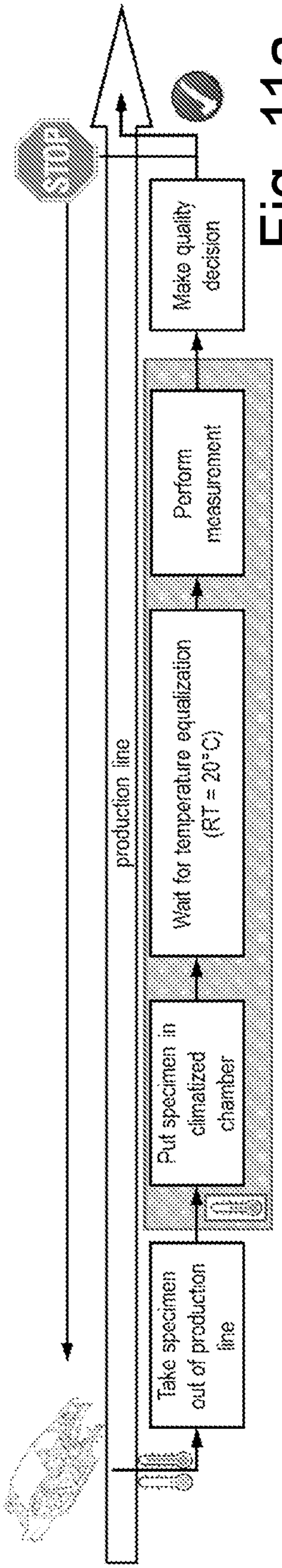
Fig. 11a (prior art)
FIG. 11*a* illustrates a first prior art method for measuring a workpiece in a production line.
Figure 11B:
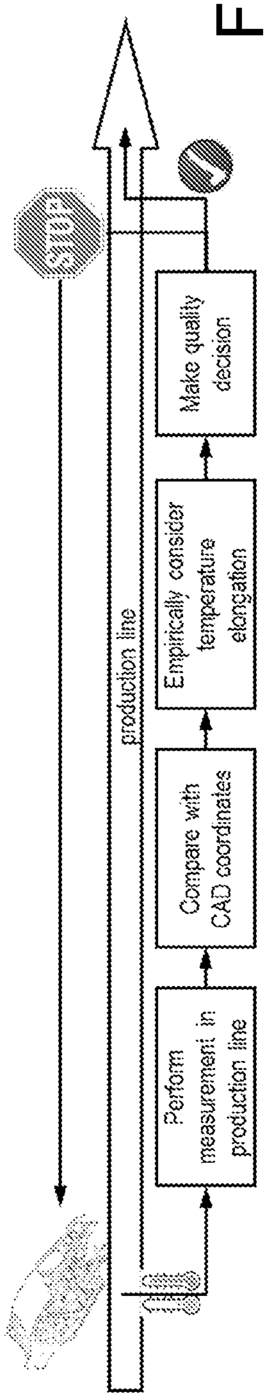
Fig. 11b (prior art)
FIG. 11*b* illustrates a second prior art method for measuring a workpiece in a production line.

FIGS. 11*a* and 11*b* illustrate two different methods for measuring a workpiece in a production line. In the shown examples, the workpiece is a car body which is produced in a production line comprising a multitude of production steps. Dimensions of specimens of the workpiece need to be checked at the end of the production line or between two production steps. Based thereon, a quality decision is made. If the measured dimensions of the workpiece meet predefined thresholds, the workpiece is good for further production or delivering to a customer. If the measured dimensions of the workpiece do not meet the predefined thresholds, the workpiece is rejected, i.e. the workpiece is scrapped or removed into the production line to be redone or adapted. Also, the production line may be halted to check for recurring production errors etc.

In the method shown in FIG. 11*a*, a specimen is taken out of the production line which is not climatized, so that a temperature of the specimen or a temperature distribution in the specimen are not known. The specimen is put into a climatized chamber having a temperature that meets a pre-defined measuring temperature, e.g. 20° C. Then, the method requires waiting until the temperature of the specimen has equalized to the temperature of the climatized chamber, before the measurement can be performed.

In the method shown in FIG. 11*b*, the specimen can be measured in the production line, i.e. during production or between two production steps, for instance using the laser tracker of FIG. 10. A temperature at the production line can be measured to determine a temperature difference to the pre-defined measuring temperature. The measured dimensions are compared with CAD coordinates, wherein temperature elongation is considered empirically.

Figure 12:
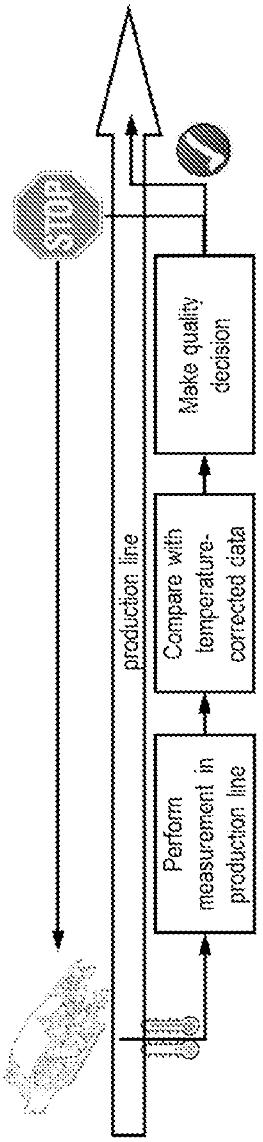
FIG. 12 illustrates an exemplary method for measuring a workpiece in a production line.

FIG. 12 illustrates an exemplary method for measuring a workpiece in a production line. This method considers the temperature-dependent elongation effect and leads to precise measurement result allowing a fast and confident quality decision. Similar to the method of FIG. 11*b*, the specimen can be measured without being taken out of the production line, for instance during production or between two production steps using the laser tracker of FIG. 10. The measurement includes measuring a temperature of the workpiece or a temperature distribution of the workpiece. The measured coordinates are compared with temperature-corrected data (e.g. as described above with respect to FIG. 7*b*) before the quality decision is made.

For instance, the comparison with temperature-corrected data may comprise using a finite-element model (FE model), calculating temperature elongation depending on temperature variation, and integrating temperature correction information into the measuring system as a lookup table.

Figure 13:
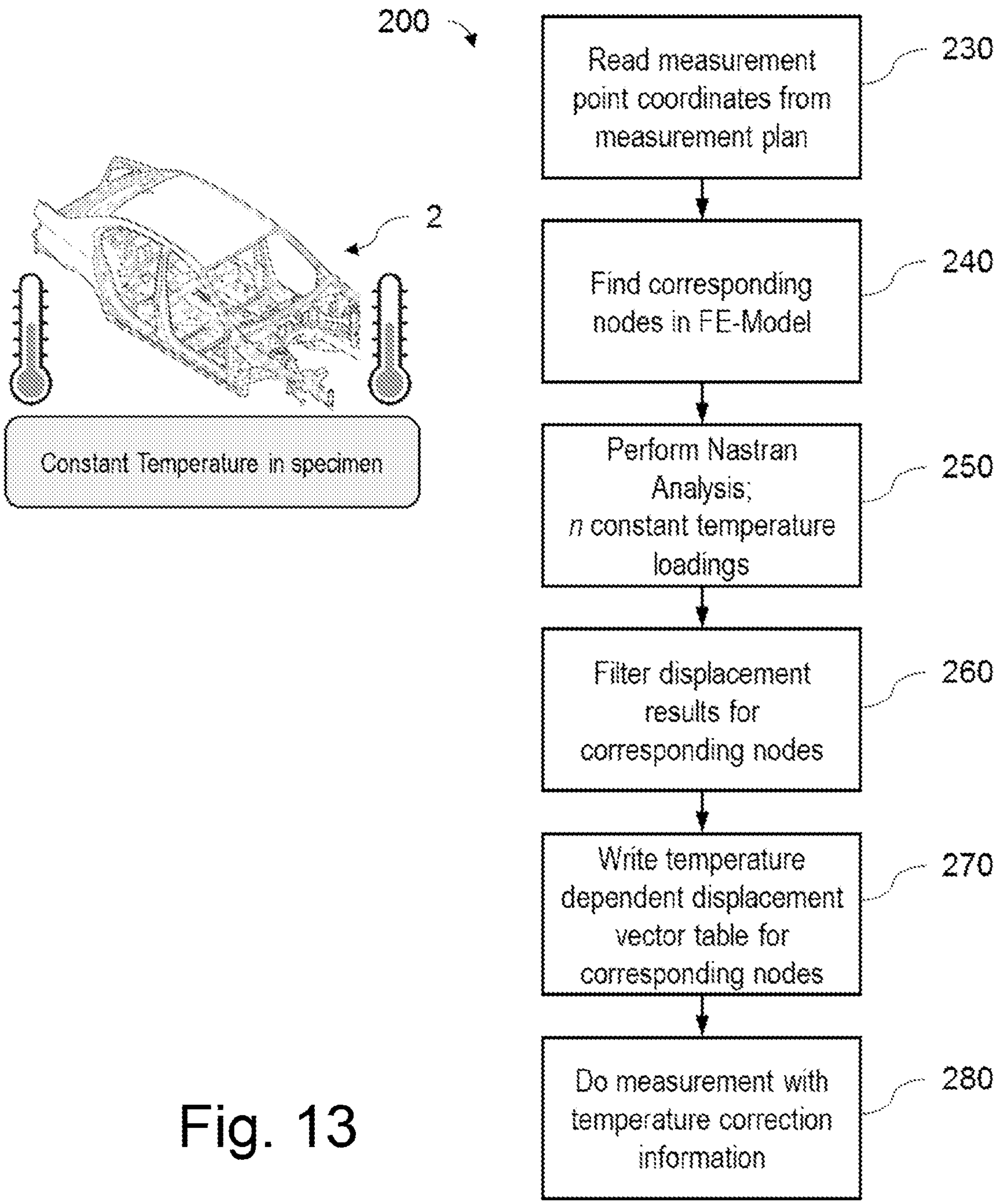
FIG. 13 shows a flowchart illustrating a first exemplary embodiment of a method measuring a workpiece in a production line.

FIG. 13 shows a flowchart illustrating an exemplary embodiment of a method 200 for measuring a workpiece 2, for instance in a production line. For performing this method, the overall temperature of the workpiece 2 preferably should be the same or basically the same. For instance, this is the case in a production line that is not climatized, i.e. has a different temperature than a pre-defined normal temperature. After the uniform temperature of the workpiece has been determined, the method 200 starts with reading defined measurement point coordinates from a measurement plan (step 230). Next, corresponding nodes are found 240 in the FE model for each of the defined measurement point coordinates. A Nastran analysis (or an analysis using a different solver) is performed 250 with n constant temperature loadings. Displacement results for the corresponding nodes are filtered 260 and temperature-dependent displacement vector tables are written 270 for the corresponding nodes. Then, the coordinate measurement is performed 280 at the pre-defined measurement point coordinates using the calculated temperature correction information.

Figure 14:
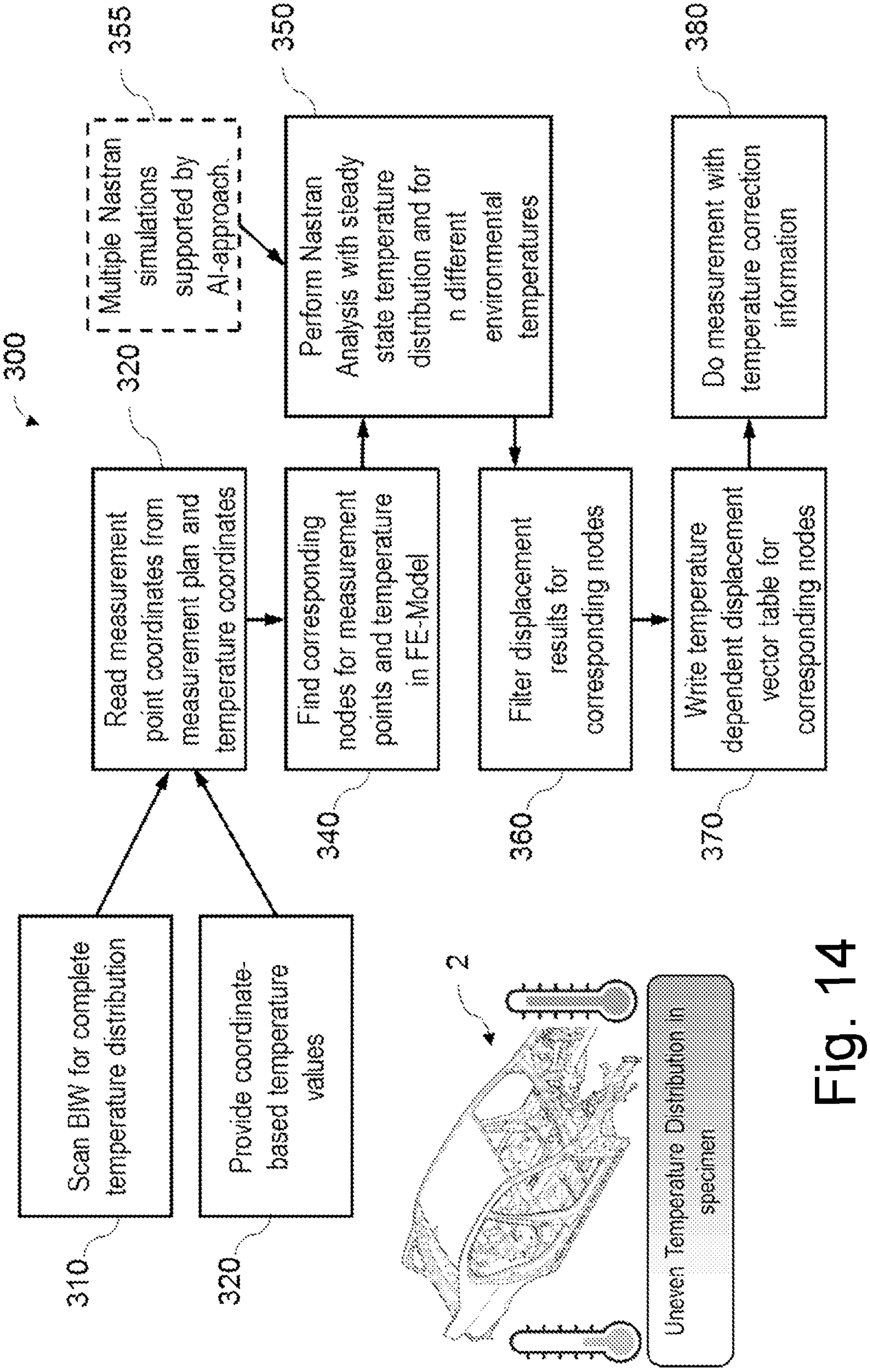
FIG. 14 shows a flowchart illustrating a second exemplary embodiment of a method measuring a workpiece in a production line.

FIG. 14 shows a flowchart illustrating another exemplary embodiment of a method 300 for measuring a workpiece 2, for instance in a production line. For performing this method, the temperature of the workpiece 2 need not be constant or uniform, i.e. the workpiece can have an uneven temperature distribution. For instance, this is the case if recent production steps induced heat at some parts of the workpiece but not at others, or if one side of the workpiece was exposed to a heat source, such as a machine or direct sunlight. The method 300 begins with determining the temperature distribution of the workpiece by performing 310 a scan of the complete workpiece, e.g. using one or more thermal imaging temperature sensors and/or a multitude of contact temperature measurements. Coordinate-based temperature values are provided 320 by a model of the workpiece. Then, the defined measurement point coordinates provided by a measurement plan and the temperature coordinates are read (step 330). For each of the defined measurement point coordinates and their determined temperatures, a corresponding node is identified 340 in the FE model. A Nastran analysis (or an analysis using a different solver) is performed 350 with a steady state temperature distribution and for a multitude of different temperatures. This may include multiple Nastran simulations 355 that are supported by artificial intelligence approaches. Displacement results for the corresponding nodes are filtered 360 and temperature-dependent displacement vector tables are written 370 for the corresponding nodes. Then, the coordinate measurement is performed 380 at the pre-defined measurement point coordinates using the calculated temperature correction information.

In contrast to other methods, the methods shown in FIGS. 13 and 14 are able to provide a compensation that is based on a full three-dimensional temperature distribution instead of only providing a punctually measured temperature or at least a temperature picture on the surface.

Although the disclosure is illustrated above, partly with reference to some preferred embodiments, it must be understood that numerous modifications and combinations of different features of the embodiments can be made. All of these modifications lie within the scope of the appended claims.

The invention claimed is:

1. A coordinate measuring system for determining three-dimensional coordinates of an object after a production step of a production process of the object, the coordinate measuring system comprising a coordinate measuring device, at least one temperature sensor and a computing device, wherein:

the coordinate measuring device comprises an arrangement of sensors configured to generate measurement data from which three-dimensional coordinates of at least one measurement point on the object are derivable, and is configured to provide the measurement data to the computing device;

the at least one temperature sensor is configured to determine one or more actual temperature values of the object, to generate temperature data based on the determined actual temperature values and to provide the temperature data to the computing device; and the computing device is configured to:

store nominal data of the object in a data storage, the nominal data comprising one or more expansion coefficients of the object and nominal dimension data of the object for a pre-defined measuring temperature;

receive the measurement data and the temperature data; and determine, based on the nominal data and on the received temperature data, whether the determined actual temperature values of the object deviate from the pre-defined measuring temperature, wherein, if the actual temperature values of the object deviate from the pre-defined measuring temperature, the computing device is configured to:

determine, based on the received measurement data, on the provided temperature data and on the stored expansion coefficients, tempered coordinates of the object, wherein the tempered coordinates are three-dimensional coordinates that the object would have at a tempered state in which the object uniformly has the pre-defined temperature; and determine, based on the tempered coordinates, dimensional deviations of the object at the pre-defined temperature from the nominal dimension data, wherein:

if the dimensional deviations meet a predefined threshold, the computing device is configured to clear the object for a subsequent production step of the production process; and if the dimensional deviations exceed the predefined threshold, the computing device is configured: to trigger a corrective action in the production process.

2. The coordinate measuring system according to claim 1, wherein determining the tempered coordinates of the object comprises obtaining measurement point coordinates of one or more measurement points to be measured by the coordinate measuring device;

identifying, in a numerical simulation model of the object, one or more neighboring nodes for each of the one or more measurement points, determining a node-based displacement vector for each neighboring node;

applying, to each of the one or more measurement points, the node-based displacement vector of one neighboring node, or an interpolated displacement vector calculated from the node-based displacement vectors of a plurality of neighboring nodes, to generate temperature correction information for each of the one or more measurement points, wherein the temperature correction information comprises temperature-corrected three-dimensional coordinates, and for determining the tempered coordinates of the object, the computing device is configured to provide the temperature-corrected three-dimensional coordinates to the coordinate measuring device to effect measurement of the one or more measurement points at the temperature-corrected three-dimensional coordinates.

3. The coordinate measuring system according to claim 2, wherein determining the tempered coordinates of the object comprises correcting three-dimensional coordinates of the one or more measurement points measured by the coordinate measuring device using the temperature correction information; and/or determining the node-based displacement vector comprises using a numerical temperature simulation to calculate an elongation value for a difference between the pre-defined temperature and one or more actual temperatures.

4. The coordinate measuring system according to claim 1, wherein the coordinate measuring device is a coordinate measuring machine comprising:

a base;

a probe head;

a frame structure comprising a plurality of frame members and one or more actuators; and a control unit configured to control the actuators to move the probe head along a measurement path to approach a plurality of measurement points on the object, wherein the frame members are arranged to movably connect the probe head to the base so that the probe head can approach an object that is positioned on the base, the movability of the probe head defining a working volume of the coordinate measuring machine, wherein:

the control unit comprises the computing device; and/or the control unit is configured to define the measurement path based on the determined deformation of the object; and/or the control unit is configured to adapt the measurement path in real-time based on the determined deformation of the object; and/or the coordinate measuring machine comprises one or more fixations configured to fix a position and orientation of the object on the base, and expansion coefficients of the fixations are considered by the computing device for determining the tempered coordinates.

5. The coordinate measuring system according to claim 4, wherein the probe head comprises a contacting temperature sensor configured to approach and contact surface points of the object to measure a temperature at each of the contacted surface points and to generate contact temperature values for each of the surface points, wherein:

the computing device is configured to adjust the temperature data from the at least one temperature sensor using the contact temperature values; and/or the contacting temperature sensor is included in a tactile stylus that is used for approaching the plurality of measurement points on the object; and/or the control unit is configured to control the actuators to move the probe head along the measurement path to approach the plurality of measurement points and the plurality of contacted surface points; and/or each feature of the object comprising at least one measurement point also comprises at least one contacted surface point; and/or at least one contacted surface point is a measurement point.

6. The coordinate measuring system according to claim 1, wherein the system is configured to determine three-dimensional coordinates of the object in a production line, wherein the object is a specimen of a workpiece being produced in the production line, and the corrective action in the production process comprises halting the production line.

7. The coordinate measuring system according to claim 1, wherein the at least one temperature sensor is a thermal imaging temperature sensor that is configured:

to be directed to the object or, if the coordinate measuring device is a coordinate measuring machine, to a working volume of the coordinate measuring machine, and to generate the temperature data in the form of one or more thermal images, wherein the computing device is configured to determine the tempered coordinates based on the thermal images, wherein, if the coordinate measuring device is a coordinate measuring machine, the thermal imaging temperature sensor is:

attached to one of the frame members or to the probe head and movable relative to the base; and/or configured to determine the actual temperature values continuously and to generate a plurality of sets of temperature data based on the continuously determined actual temperature values, wherein each set of temperature data is provided to the computing unit referenced to a position of the probe head.

8. The coordinate measuring system according to claim 1, wherein the at least one temperature sensor is configured:

to determine the actual temperature values continuously and to generate a plurality of sets of temperature data based on the continuously determined actual temperature values, wherein each set of temperature data is provided to the computing device in real time, together with a time-stamp, and/or referenced to the measurement data; and/or to determine the actual temperature values synchronously with the generation of the measurement data by the arrangement of sensors.

9. The coordinate measuring system according to claim 8, wherein each set of temperature data is provided to the computing device referenced to a position of a probe head of the coordinate measuring machine, wherein the actual temperature values are determined while the three-dimensional coordinates of the measurement points are determined.

10. The coordinate measuring system according to claim 1, wherein the computing device is configured to determine a deformation of the object based on the provided temperature data and on the expansion coefficients, the deformation being in relation to a condition of the same object having the pre-defined temperature; and/or to use artificial intelligence to enhance temperature data provided by the at least one temperature sensor to obtain enhanced temperature data, wherein the tempered coordinates are determined also based on the enhanced temperature data.

11. The coordinate measuring system according to claim 1, comprising at least one attachable temperature sensor configured to be attached to surface points of the object to measure a temperature at the surface points and to generate contact temperature values for the surface points, wherein the computing device is configured to adjust the temperature data from the at least one temperature sensor using the contact temperature values.

12. The coordinate measuring system according to claim 1, wherein a first temperature sensor is configured to determine the one or more actual temperature values of the object by means of infrared measurement; and one or more second temperature sensors are configured to contact surface points of the object, to measure a temperature at the respective surface point and to generate contact temperature values for the respective surface point, wherein:

the contact temperature values for the surface points are used to calibrate or correct the one or more actual temperature values of the object measured by the at least one temperature sensor, the surface points are defined for determining an emissivity of the related surface, wherein defining the surface points comprises detecting reflective surfaces on the object using the nominal dimension data, material information of the object and/or the temperature data from the one or more thermal imaging temperature sensor; and/or the at least one temperature sensor is configured to move relative to the object while determining one or more actual temperature values of the same surface of the object by means of infrared measurement, and the computing device is configured to determine an emissivity and/or a reflectivity of said surface and to correct, based on the determined emissivity and/or reflectivity, one or more actual temperature values on said surface using the contact temperature values.

13. The coordinate measuring system according to claim 1, wherein the computing device is configured to determine a deformation of the object based on the provided temperature data and on the expansion coefficients, the deformation being in relation to a condition of the same object having the pre-defined temperature, wherein determining the tempered coordinates is based on the determined 3D coordinates and on the determined deformation.

14. The coordinate measuring system according to claim 1, wherein the corrective action in the production process comprises at least one of:

adapting the object by iterating a previous production step; and halting a production line of the object; and increasing a measurement frequency to check for recurring production errors in the production process.

15. The coordinate measuring system according to claim 1, wherein the at least one temperature sensor is a thermal imaging temperature sensor that is configured to be directed to the object and to generate the temperature data in the form of one or more thermal images.

16. A computer-implemented method for determining deviations of actual dimensions of a workpiece from nominal dimensions after a production step of a production process of the workpiece, the method comprising:

storing nominal data of the workpiece in a data storage, the nominal data comprising one or more expansion coefficients of the workpiece and nominal dimension data of the workpiece for a pre-defined measuring temperature;

measuring three-dimensional coordinates of the workpiece using a coordinate measuring device;

measuring the one or more actual temperatures of the workpiece using at least one temperature sensor; and determining, based on the nominal data on the measured one or more actual temperatures, whether the determined actual temperature values of the workpiece deviate from the pre-defined measuring temperature, wherein, if the actual temperature values of the workpiece deviate from the pre-defined measuring temperature, the method further comprises:

determining, based on the nominal data, on the measured one or more actual temperatures and on the stored expansion coefficients-of, tempered coordinates of the workpiece, wherein the tempered coordinates are three-dimensional coordinates that the workpiece would have at a tempered state in which the workpiece uniformly has the pre-defined temperature;

determining, based on the tempered coordinates, dimensional deviations of the workpiece at the pre-defined temperature from the nominal dimension data;

if the dimensional deviations meet a predefined threshold, clearing the workpiece for a subsequent production step of the production process or for shipment; and if the dimensional deviations exceed the predefined threshold, triggering a corrective action in the production process.

17. The method according to claim 16, wherein determining the tempered coordinates of the workpiece comprises obtaining measurement point coordinates of one or more measurement points to be measured by the coordinate measuring device;

identifying, in a numerical simulation model of the workpiece, one or more neighboring nodes for each of the one or more measurement points, determining a node-based displacement vector for each neighboring node;

applying, to each of the one or more measurement points, the node-based displacement vector of one neighboring node, or an interpolated displacement vector calculated from the node-based displacement vectors of a plurality of neighboring nodes, to generate temperature correction information for each of the one or more measurement points.

18. The method according to claim 16, comprising determining a deformation of the workpiece based on the provided temperature data and on the expansion coefficients, the deformation being in relation to a condition of the same workpiece having the pre-defined temperature, wherein determining the tempered coordinates is based on the measured three-dimensional coordinates and on the determined deformation;

a measurement path for a probe head of the coordinate measuring device is defined based on the determined deformation of the workpiece; and/or a measurement path for a probe head of the coordinate measuring device is adapted in real-time based on the determined deformation of the workpiece.

19. A computer program product comprising program code which is stored on a non-transitory machine-readable medium, and having computer-executable instructions for performing, when executed on a computing device of a coordinate measuring system, the method according to claim 16.

20. A coordinate measuring system for determining three-dimensional coordinates of a workpiece, the coordinate measuring system comprising a coordinate measuring device, at least one temperature sensor and a computing device, wherein:

the coordinate measuring device comprises an arrangement of sensors configured to generate measurement data from which three-dimensional coordinates of at least one measurement point on the workpiece are derivable;

the at least one temperature sensor is configured to determine one or more actual temperature values of the workpiece during a measurement process, to generate temperature data based on the determined actual temperature values and to provide the temperature data to the computing device, wherein the determined actual temperature values of the workpiece deviate from a pre-defined temperature; and the computing device is configured to:

store nominal data of the workpiece in a data storage, the nominal data comprising nominal dimension data of the workpiece for the pre-defined temperature and one or more expansion coefficients of the workpiece;

transform the determined three-dimensional coordinates of the measurement points into tempered coordinates of the workpiece by applying a thermal compensation model based on the provided temperature data and on the expansion coefficients, wherein the tempered coordinates represent the workpiece at the pre-defined temperature, quantify, based on the tempered coordinates, deviations of the workpiece at the pre-defined temperature from the nominal dimension data; and generate a control signal if the deviations exceed a predefined threshold, the control signal being configured to trigger a corrective action in a manufacturing process and/or to output a technical validation report to a user interface.

* * * * *